April 17, 1934.   J. G. HALL   1,955,420
REPAIR PATCH FOR AUTOMOBILE TIRES
Filed Nov. 2, 1933
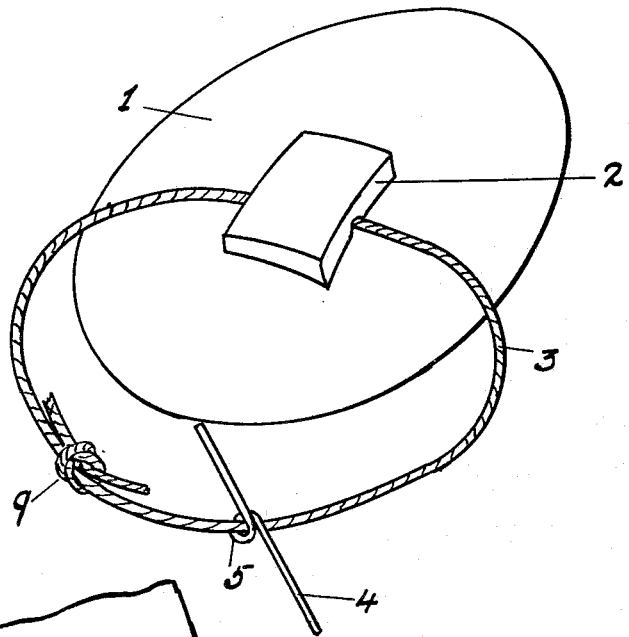
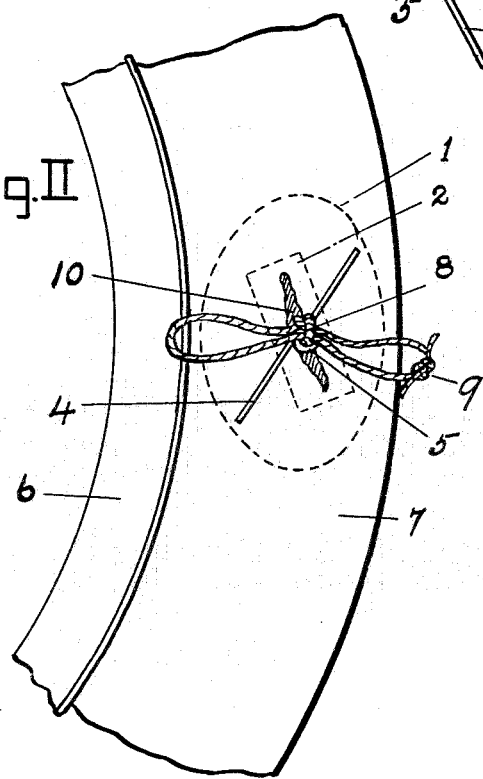
JOHN G. HALL.
INVENTOR
BY Arthur Scrivenor.
ATTORNEY Patented Apr. 17, 1934

1,955,420

UNITED STATES PATENT OFFICE 1,955,420

REPAIR PATCH FOR AUTOMOBILE TIRES

John G. Hall, Richmond, Va.

Application November 2, 1933, Serial No. 696,308

1 Claim. (Cl. 152—26)

My invention relates to patches for repairing the casings of automobile tires; and it has for its object the production of a patch which may be used for repairing casings after receiving punctures and minor blow-outs; which is not liable to be displaced from the position in which it has been set when the casing is being put back upon the rim; and which will afford full protection to the inner tube. An old form of blow-out patch consisted of a piece of soft uncured rubber cemented onto a sheet of fabric. This fabric was coated upon its face with rubber cement so that it might stick when placed in position inside the casing. Upon receiving a puncture the tire is removed from the rim; the inner tube and flap are taken out; the tube is repaired; the inside of the casing is scraped clean around the puncture; the patch is then so placed in the casing that the piece of soft rubber will cover the hole in the casing; and the patch is pressed into place, the cement causing it to stick to the inside of the casing. The tube and flap are now put back into the casing; the tube is partly inflated; and the tube and casing are now forced back into place upon the rim. The tube is now fully inflated.

After the tube has been replaced in the casing, the repair patch is usually hidden by the tube. During the process of manipulating the partly inflated tire to get it back upon the rim it often happens that the repair patch is pushed out of place in the casing so that it is no longer over the hole which it was intended it should cover. This state of affairs has often been discovered upon a subsequent removing of the tire.

My repair patch can be placed in position in the casing; and it will remain in position during and after the replacing of the tire upon the rim.

In the drawing Figure I shows my patch in perspective. In Figure II I show the patch in place in a casing on a rim, in part, before the rim has been replaced upon the felly of the wheel.

In Figure I at 1 is shown a piece of fabric or soft rubber or other suitable material; and at 2 there is shown a piece of soft uncured rubber. I coat one face of the piece 2 with a strong cement, except for a strip across its middle. I then lay the string 3 across the bare strip on the cemented face of the piece 2, and then press the cemented face to the piece 2 down upon the approximate center, or other desired point, of the piece 1. The string 3 will now be held loosely under the piece 2 upon the piece 1, as seen in Figure I. The exposed face of the piece 2 and the exposed face of the piece 1 are now coated with cement, which is allowed to dry to an extent that the patch may be handled and packed for shipping. It is usual to revive the cement which has partly dried upon the face of the patch with fresh cement or other suitable liquid before it is placed in the casing to be repaired. If it is desired the exposed faces of the pieces 1 and 2 need not be coated with cement until the patch is to be used; but as a rule it is given a drying coat as soon as made or before shipment, so that less cement is required for a road repair. It is to be seen that the string 3 is not cemented to either of the pieces 1 and 2. It is free to be pulled out from between them. This freedom of the string can be secured in other ways than by leaving a bare strip across the face of piece 2 when cementing it. It is important that the string shall not be cemented to the piece of soft uncured rubber 2, so that the string may be withdrawn without damage to the latter after the patch has been placed in the tire.

Upon the string is threaded the double ended needle 4, which is provided with an eye 5, preferably at a point intermediate its length so that the needle may be used as a belaying-pin or a toggle-pin for securing the string when the patch is placed. I knot the free ends of the string together as at 9. In Figure II, wherein 6 is a part of a rim, and 7 is part of a casing, I have shown the needle 4 laid crosswise of a cut in the casing, and the string 3 tied over it.

In using my patch: having found a puncture or cut in the tire I remove the casing. I then cement the face of the patch; pass the needle through the hole in the casing from the inside to the outside; pull the string through; adjust the patch in position, so that the piece of uncured rubber 2 will cover the hole in the casing; and then by pulling upon the string draw the patch tight against the inside of the casing; pressing it with my free hand until it sticks to the casing. Now, to make sure that the patch is not displaced while I am replacing the tire upon the rim, I draw the string tight, then let the needle run down the string until it lies upon the surface of the casing, arranging it crosswise of the puncture or cut, as shown in Figure II, in which a cut is indicated at 10; and then taking the two parts of the string in my two hands I tie a half hitch 8 over the needle, also as shown. If desired another hitch can be tied over the first one for greater security; but as a rule, one is enough. The string cannot slip now, and the patch is secured in place. The tube is now inflated, partially; and it is replaced in the casing. The casing, tube, and flap may now be replaced on the rim, and the rim on the wheel, without danger of the patch being pushed out of position. Lastly, the tire is blown up to the desired pressure. Whenever it is desired to remove the needle and string, the knot 9 is untied, the needle is slipped off the string; and, taking hold of one end of the string, and pulling on it, the string slides out from under the piece 2 of the patch, and is so removed from the tire. This is done so that the hole in the casing may be properly plugged by the uncured rubber 2, to prevent the entrance of wet and grit during subsequent running. The string may be removed before the tire is pumped up to the full pressure if desired.

The surface of the piece 2 which contacts with the casing is unbroken in my patch; and this is important, for if it was broken, or torn, or punctured, it would not properly plug the hole in the casing; and wet and grit would find their way not only through the casing but also through the piece 2. Then only the cement on the face of the piece 1 would prevent or hinder the wet and grit from coming into contact with the tube. When a single thread or string is passed through the center of a piece like the piece 2 and is knotted behind it; and such a patch is in place, and the string is pulled out, obviously there is a hole through the piece 2 corresponding or registering with the hole in the casing. Any arrangement of string which will injure the face of the piece 2 adjacent to the puncture to be covered is objectionable.

For the same reason, if a double or a single string is cemented to either face of the piece 2, which comes into contact with the inside of the casing, and the string is torn away, the outer surface of the piece 2 is liable to be damaged. Furthermore, if the string is held by cement to the surface of the piece 1 under the piece 2, when the string is pulled out the piece 2 will be torn, and one of the important objects of using the patch will be defeated, namely to plug the hole in the casing and to reenforce the material surrounding the hole.

I claim:—

A repair patch for automobile tire casings consisting of a base part adapted to be cemented to the inside surface of the casing, a piece of soft rubber to cover the defect in the casing secured to the base part, a string slidably mounted between the base part and the piece of soft rubber, and a needle threaded at a point intermediate its length on the string; the string being arranged with respect to the piece of soft rubber and the needle so that by it the patch may be pulled into place in the casing, the string when tied over the needle to hold the patch in place while the tire is being replaced upon the wheel, and so that then the string may be slid out from between the base part and the piece of soft rubber and be removed from the tire through the opening in the casing.

JOHN G. HALL.